(12) United States Patent
Lee et al.

(10) Patent No.: US 12,257,599 B2
(45) Date of Patent: *Mar. 25, 2025

(54) SLOT DIE COATER ADJUSTING DEVICE FOR CONTROLLING DISTANCE BETWEEN UPPER DISCHARGE PORT AND LOWER DISCHARGE PORT OF SLOT DIE COATER, AND ELECTRODE ACTIVE MATERIAL COATING SYSTEM INCLUDING SAME

(71) Applicant: LG Energy Solution, Ltd., Seoul (KR)

(72) Inventors: Do-Hyun Lee, Daejeon (KR); Cheol-Woo Kim, Daejeon (KR); Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 15 days.

This patent is subject to a terminal disclaimer.

(21) Appl. No.: 18/196,273

(22) Filed: May 11, 2023

(65) Prior Publication Data

US 2023/0278066 A1 Sep. 7, 2023

Related U.S. Application Data

(63) Continuation of application No. 17/276,996, filed as application No. PCT/KR2019/012763 on Sep. 30, 2019, now Pat. No. 11,691,173.

(30) Foreign Application Priority Data

Oct. 1, 2018 (KR) .......................... 10-2018-0117142

(51) Int. Cl.
*B05C 5/02* (2006.01)
*B05C 9/06* (2006.01)
(Continued)

(52) U.S. Cl.
CPC .............. *B05C 5/0262* (2013.01); *B05C 9/06* (2013.01); *B05C 11/02* (2013.01); *B05C 11/1002* (2013.01); *H01M 4/0404* (2013.01)

(58) Field of Classification Search
USPC .................................. 118/411, 412, 419, 231
See application file for complete search history.

(56) References Cited

U.S. PATENT DOCUMENTS 5,425,967 A 6/1995 Tomaru
5,834,052 A 11/1998 Fukumura et al.
(Continued)

FOREIGN PATENT DOCUMENTS

CN 1166144 A 11/1997
CN 101844125 A 9/2010
(Continued)

OTHER PUBLICATIONS

English Translation JP-2016030253A (Year: 2016).*
(Continued)

*Primary Examiner* — Yewebdar T Tadesse
(74) *Attorney, Agent, or Firm* — Lerner David LLP

(57) ABSTRACT

Disclosed is a slot die coater adjusting device, which adjusts a slot die coater including a lower die having a lower discharge hole for discharging a first active material slurry and an upper die having an upper discharge hole for discharging a second active material slurry, to adjust a distance between the lower discharge hole and the upper discharge hole by allowing the upper die to move. The slot die coater adjusting device includes pressing block assemblies respectively provided to both longitudinal sides of the slot die coater and fixed to the upper die; a linear motion (LM) guide disposed at a lower portion of the pressing block assembly and connected to the pressing block assembly to guide a movement of the pressing block assembly; a servo motor (Continued)

configured to give a power for moving the LM guide; and a reducer connected between the servo motor and the LM guide.

10 Claims, 8 Drawing Sheets

(51) Int. Cl.
*B05C 11/02* (2006.01)
*B05C 11/10* (2006.01)
*H01M 4/04* (2006.01)

(56) References Cited

U.S. PATENT DOCUMENTS

| | | | |
|---|---|---|---|
| 5,922,408 | A | 7/1999 | Nakama et al. |
| 6,199,301 | B1 | 3/2001 | Wallace |
| 8,297,221 | B2 | 10/2012 | Jackson et al. |
| 2004/0241327 | A1 | 12/2004 | Wyatt et al. |
| 2006/0096528 | A1 | 5/2006 | Kawatake et al. |
| 2010/0247792 | A1 | 9/2010 | Emoto et al. |
| 2011/0097476 | A1 | 4/2011 | Ishizu et al. |
| 2018/0250701 | A1 | 9/2018 | Kuenne |
| 2018/0275071 | A1 | 9/2018 | Choi et al. |
| 2019/0351446 | A1 | 11/2019 | Lee et al. |

FOREIGN PATENT DOCUMENTS

| | | |
|---|---|---|
| CN | 101883639 A | 11/2010 |
| CN | 108525940 A | 9/2018 |
| DE | 19514772 A1 | 10/1996 |
| EP | 0788408 B1 | 11/2001 |
| JP | H0716525 A | 1/1995 |
| JP | H09276770 A | 10/1997 |
| JP | 2001286806 A | 10/2001 |
| JP | 2001345096 A | 12/2001 |
| JP | 2002136909 A | 5/2002 |
| JP | 2004202452 A | 7/2004 |
| JP | 3622383 B2 | 2/2005 |
| JP | 2006110486 A | 4/2006 |
| JP | 2008264765 A | 11/2008 |
| JP | 2016030253 A * | 3/2016 |
| KR | 100846619 B1 | 7/2008 |
| KR | 20130005754 A | 1/2013 |
| KR | 20140028893 A | 3/2014 |
| KR | 101578765 B1 | 12/2015 |
| KR | 20160087574 A | 7/2016 |
| KR | 20160120874 A | 10/2016 |
| WO | 2019035553 A1 | 2/2019 |

OTHER PUBLICATIONS

Chinese Search Report for Application No. 201980020622.1, dated Jun. 23, 2021, 3 pages.
International Search Report for Application No. PCT/KR2019/012763, mailed Jan. 29, 2020, pp. 1-2.
Search Report dated May 24, 2022 from Office Action from Chinese Application No. 201980020622.1 issued Jun. 27, 2022. 2 pgs.
Supplemental Search Report dated Jan. 10, 2022 from the Office Action for Chinese Application No. 201980020622 issued Jan. 18, 2022, 2 pgs.
Supplementary European Search Report from Extended Search Report Application No. 19868486.2 dated Jul. 5, 2021. 2 pgs.

* cited by examiner

SLOT DIE COATER ADJUSTING DEVICE FOR CONTROLLING DISTANCE BETWEEN UPPER DISCHARGE PORT AND LOWER DISCHARGE PORT OF SLOT DIE COATER, AND ELECTRODE ACTIVE MATERIAL COATING SYSTEM INCLUDING SAME

CROSS-REFERENCE TO RELATED APPLICATIONS

This application is a continuation of U.S. application Ser. No. 17/276,996, filed on Mar. 17, 2021, which is a national phase entry under 35 U.S.C. § 371 of International Application No. PCT/KR2019/012763, filed on Sep. 30, 2019, which claims priority to Korean Patent Application No. 10-2018-0117142, filed on Oct. 1, 2018, the disclosures of which are incorporated herein by reference in their entirety.

TECHNICAL FIELD

The present disclosure relates to a slot die coater adjusting device and a slot die coater adjusting system including the slot die coater adjusting device, and more particularly, to a slot die coater adjusting device configured to adjust a distance between an upper discharge hole and a lower discharge hole of a slot die coater by moving an upper die of the slot die coater in a front and rear direction and an electrode active material coating system including the slot die coater adjusting device.

BACKGROUND ART

As the development and demand for mobile devices increase, secondary batteries are consumed as energy sources more and more. The secondary battery essentially includes an electrode assembly, which is a power generation element.

The electrode assembly is configured such that a positive electrode, a separator and a negative electrode are stacked at least one time, and the positive electrode and the negative electrode are respectively prepared by coating a positive electrode active material slurry and a negative electrode active material slurry on electrode current collectors made of an aluminum foil and an copper foil, respectively, and then drying the same.

In order to make the charging and discharging characteristic of the secondary battery uniform, the positive electrode active material slurry and the negative electrode active material slurry should be evenly coated on the current collectors. For this, a slot die coating process is usually performed.

FIG. 1 is a schematic view showing a conventional slot die coater in use. Referring to FIG. 1, a coating device 10 includes a slot die coater 20 and a coating roll 40 through which an electrode active material slurry is discharged. The coating roll 40 is rotated to coat an active material on a current collector 50.

The electrode active material slurry discharged from the slot die coater 20 is widely applied on one surface of the current collector 50 to form an electrode active material layer.

In some cases, two electrode active material layers may be additionally formed by applying an electrode active material layer forming another layer on the electrode active material layer forming one layer. In order to form two electrode active material layers as above, as shown in FIG. 2, typically, a slot die coater 70 having three die blocks 71, 72, 73 is used. This type of slot die coater 70 simultaneously discharges the electrode active material slurry through two discharge holes 74, 75 formed between neighboring die blocks so that an additional electrode active material slurry is continuously formed on the electrode active material layer formed by the electrode active material slurry applied before.

However, the process using the slot die coater 70 requires to use the electrode active material slurry discharged simultaneously from different discharge holes 74, 75, so it is quite difficult to form each electrode active material layer to a desired thickness.

In general, the thickness of each electrode active material layer is affected by a discharged amount of the electrode active material slurry through the discharge holes 74, 75, and the discharged amount of the electrode active material slurry is greatly influenced by the gap between the die blocks 71, 72, 73. Thus, in order to obtain a desired thickness, the die blocks 71, 72, 73 should be disassembled and reassembled to adjust the gap, and the discharged amount should be checked again. This process should be repeatedly performed.

However, in the conventional slot die coater 70, since three die blocks 71, 72, 73 are sequentially coupled to each other to form two discharge holes 74, 75, in order to adjust the gap of any one discharge hole 74, 75, all die blocks 71, 72, 73 should be separated. Also, even though only one die block is separated, this may affect the positions of the other die blocks, so it is difficult to adjust two discharge holes 74, 75 individually.

Further, repeating the process of separating and reassembling the die blocks and carrying out a test coating several times causes a delay in the process time and increases the consumption of the electrode active material slurry, which is a material, which greatly reduces the overall efficiency of the process. On the other hand, repeated disassembling and assembling may adversely affect the life of the slot die coater.

Thus, there is an urgent need to develop a slot die coater having an improved structure capable of solving the above this problems, namely a slot die coater having a structure capable of adjusting a distance between an upper discharge hole and a lower discharge hole by the relative movement of an upper die and a lower die and a slot die coater adjusting device configured to adjust the distance between the upper coater and the lower coater of the slot die coater.

DISCLOSURE

Technical Problem

The present disclosure is designed to solve the problems of the related art, and therefore the present disclosure is directed to adjusting a distance between an upper discharge hole and a lower discharge hole by allowing an upper die of a slot die coater to slide along an inclined surface at an angle with respect to the ground.

However, the technical problem to be solved by the present disclosure is not limited to the above, and other objects not mentioned herein will be understood from the following description by those skilled in the art.

Technical Solution

In one aspect of the present disclosure, there is provided a slot die coater adjusting device, which adjusts a slot die coater including a lower die having a lower discharge hole for discharging a first active material slurry and an upper die having an upper discharge hole for discharging a second active material slurry, to adjust a distance between the lower discharge hole and the upper discharge hole by allowing the upper die to move, the slot die coater adjusting device comprising: pressing block assemblies respectively provided to both longitudinal sides of the slot die coater and fixed to the upper die; a linear motion (LM) guide disposed at a lower portion of the pressing block assembly and connected to the pressing block assembly to guide a movement of the pressing block assembly; a servo motor configured to give a power for moving the LM guide; and a reducer connected between the servo motor and the LM guide.

The slot die coater adjusting device may further comprise an inclined block disposed at a lower portion of the LM guide to support the LM guide.

The inclined block may have an upper surface inclined at a predetermined angle with respect to the ground to be parallel with a facing surface of the upper die and the lower die.

The LM guide may include a guide frame; a ball screw installed inside the guide frame and connected to the reducer to receive the power therefrom; and a movable block fastened with the ball screw to linear move in a front and rear direction of the slot die coater according to a rotation of the ball screw.

The pressing block assembly may include a cam follower fixed to the upper die; and a pressing block fixed on the movable block and having an insert hole into which the cam follower is inserted.

The cam follower may include a rotary shaft fixed to the upper die; and a bearing provided in contact with an inner wall of the insert hole and configured to rotate based on the rotary shaft.

Meanwhile, in another aspect of the present disclosure, there is also provided an electrode active material coating system, comprising: a slot die coater including a lower die having a lower discharge hole for discharging a first active material slurry and an upper die having an upper discharge hole for discharging a second active material slurry; pressing block assemblies respectively provided to both longitudinal sides of the slot die coater and fixed to the upper die; a LM guide disposed at a lower portion of the pressing block assembly and connected to the pressing block assembly to guide a movement of the pressing block assembly; a servo motor configured to give a power for moving the LM guide; and a reducer connected between the servo motor and the LM guide.

Advantageous Effects

According to an aspect of the present disclosure, a distance between an upper discharge hole and a lower discharge hole may be adjusted by allowing an upper die of a slot die coater to slide along an inclined surface at an angle with respect to the ground.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, an electrode active material coating system according to an embodiment of the present disclosure will be described with reference to FIG. 3.

Figure 1:
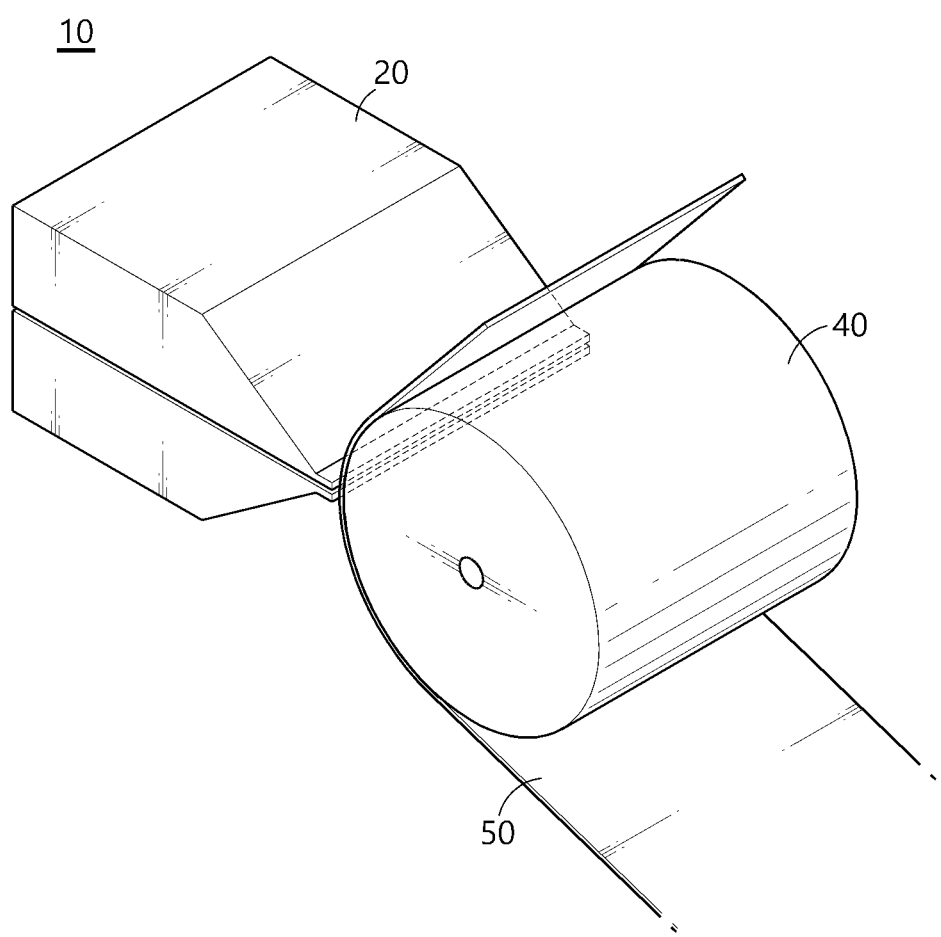
FIG. 1 is a schematic view showing a conventional slot die coater in use.
Figure 2:
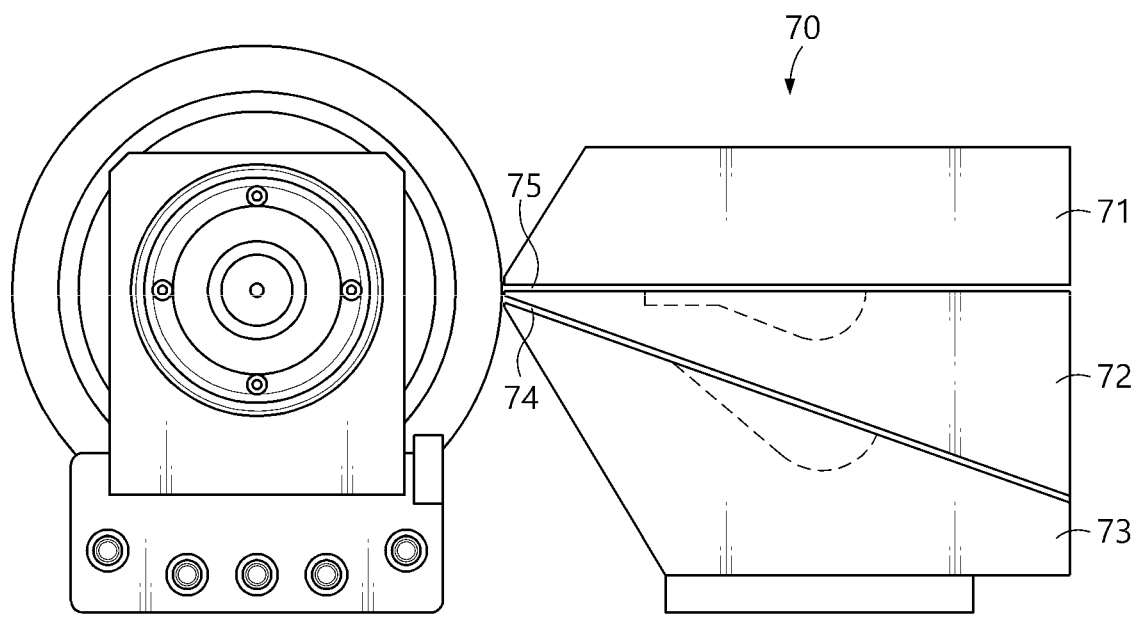
FIG. 2 is a cross-sectioned view showing the conventional slot die coater used for a multilayer active material coating process.
Figure 3:
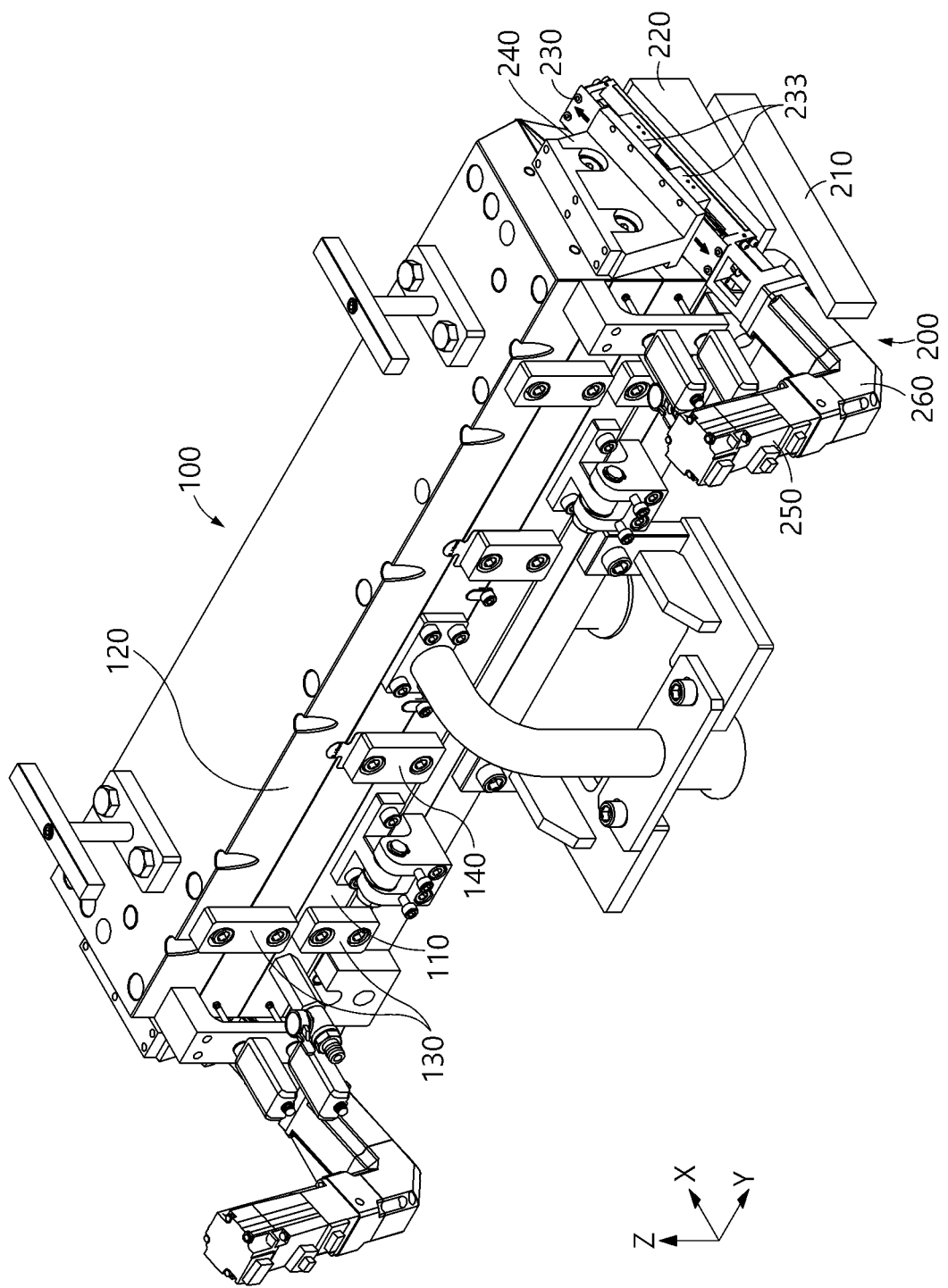
FIG. 3 is a perspective view showing an electrode active material coating system according to an embodiment of the present disclosure as a whole.

FIG. 3 is a perspective view showing an electrode active material coating system according to an embodiment of the present disclosure as a whole.

Referring to FIG. 3, the electrode active material coating system according to an embodiment of the present disclosure includes a slot die coater 100 and a slot die coater adjusting device 200.

The slot die coater 100 applies an electrode active material slurry on an electrode current collector to form an electrode active material layer. The slot die coater 100 has a structure capable of discharging an electrode active material slurry through a pair of discharge holes formed in a lower die 110 and an upper die 120, thereby forming two electrode active material layers on the electrode current collector. The specific structure and function of the slot die coater 100 according to the present disclosure will be described later in detail with reference to FIGS. 4 to 6.

The slot die coater adjusting device 200 is configured to adjust a distance between the pair of discharge holes formed in the slot die coater 100 and may be implemented to include a base block 210, an inclined block 220, a linear motion (LM) guide 230, a pressing block assembly 240, a servo motor 250, and a reducer 260.

The base block 210 is provided in a pair, and the pair of base block 210s are respectively provided to one side and the other side of the slot die coater 100 in the longitudinal direction (Y-axis direction of FIG. 3) (namely, to both longitudinal sides of the slot die coater 100) and is disposed at a lower portion of the inclined block 220 to support the inclined block 220.

The inclined block 220 is provided in a pair, and the pair of inclined blocks 220 are provided to both longitudinal sides of the slot die coater 100 and disposed at an upper portion of the base block 210. The inclined block 220 has an upper surface inclined at a predetermined angle with respect to the ground (an X-Y plane of FIG. 3), and the inclination of the upper surface is identical to that of a facing surface of the lower die 110 and the upper die 120 of the slot die coater 100. That is, the upper surface of the inclined block 220 is formed in parallel with a sliding surface S (see FIG. 4) formed by the facing surface of the lower die 110 and the upper die 120 of the slot die coater 100.

The LM guide 230 is provided in a pair, and the pair of LM guides 230 are provided to both longitudinal sides of the slot die coater 100 and placed on an upper surface of the inclined block 220. The LM guide 230 guides a movement of the pressing block assembly 240 so that the pressing block assembly 240 receives a power generated by the servo motor 250 and moves in an arrow direction of FIG. 3.

The pressing block assembly 240 is provided in a pair, and the pair of pressing block assemblies 240 are provided to both longitudinal sides of the slot die coater 100 and disposed on the LM guide 230. The pressing block assembly 240 is fixed on a movable block 233 provided to the LM guide 230 and moves along the arrow direction shown in FIG. 3 according to the movement of the movable block 233 that linearly moves by receiving the power generated by the servo motor 250.

In addition, the pair of the pressing block assemblies 240 are fixed to one side and the other side of the slot die coater 100 in the longitudinal direction, respectively. More specifically, the pair of the pressing block assemblies 240 are fixed to one side and the other side of the upper die 110, respectively. Thus, if the pressing block assembly 240 moves along the arrow direction shown in FIG. 3, the upper die 110 also moves on the lower die 120.

The servo motor 250 is provided in a pair, and the pair of servo motors 250 are provided to both longitudinal sides of the slot die coater 100 and located rearward further to the LM guide 230 and the pressing block assembly 240.

The servo motor 250 transmits a driving force through the reducer 260 to the movable block 233 of the LM guide 230, which allows the movable block 233 to linear move along the arrow direction shown in FIG. 3. The servo motor 250 is arranged to extend in a direction perpendicular to the LM guide 230.

The reducer 260 is provided in a pair, and the pair of reducers 260 are provided to both longitudinal sides of the slot die coater 100 with an approximately L shape. The reducer 260 is connected between the LM guide 230 and the servo motor 250 to transfer the driving force generated from the servo motor 250 to the LM guide 230 so that the movable block 233 may move.

The reducer 260 changes the force transmitted along the direction perpendicular to the upper surface of the inclined block 220 by the servo motor 250 into a direction perpendicular thereto, namely into a direction parallel with the upper surface of the inclined block 220. In addition, the reducer 260 may use a proper gear ratio to transmit a greater force than the force provided by the servo motor 250 to the movable block 233 of the LM guide 230 and also may allow the movable block 233 of the LM guide 230 to move finely.

Meanwhile, the servo motor 250 is located rearward further to the LM guide 230 and the pressing block assembly 240, and the reducer 260 connects the LM guide 230 and the pressing block assembly 240 to each other. This means that the servo motor 250, the reducer 260 and the LM guide 230 are arranged in order from a rear surface of the slot die coater 100 having a first fixing portion 130 and a second fixing portion 140 along a direction toward a front surface thereof opposite thereto (a direction parallel with the X axis of FIG. 3).

The specific structure of each component of the slot die coater adjusting device 200 and the specific function of the slot die coater adjusting device 200 will be described later in detail with reference to FIGS. 7 and 8.

Next, the slot die coater 100 according to an embodiment of the present disclosure will be described in detail with reference to FIGS. 4 to 6.

Figure 4:
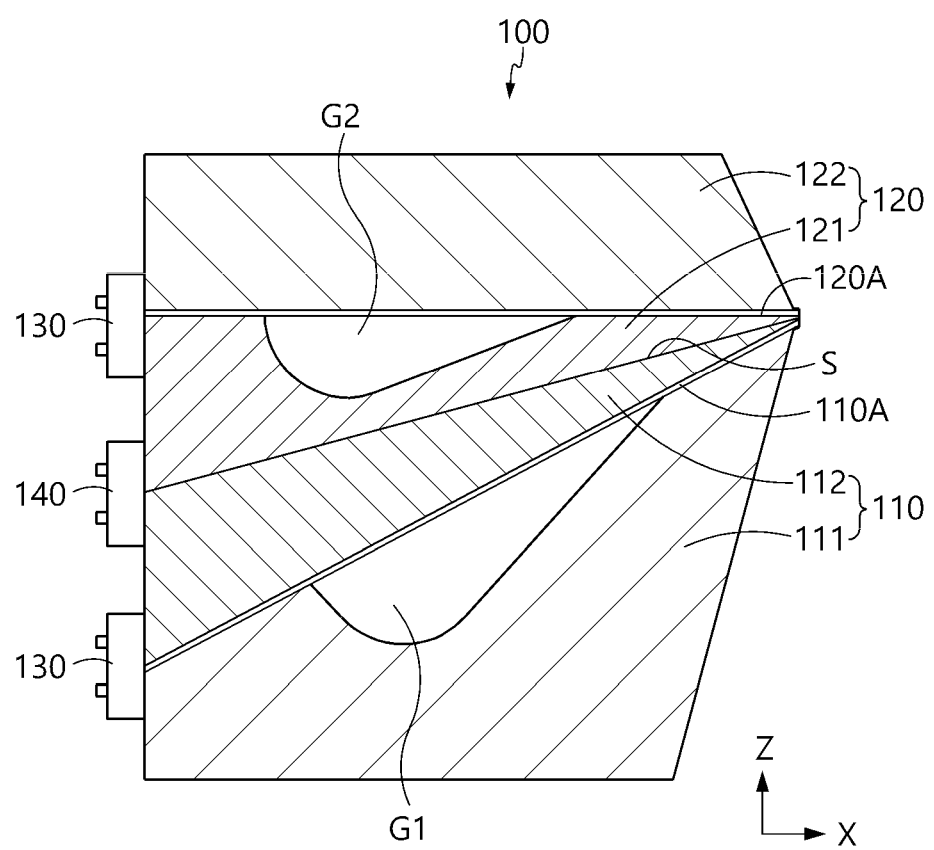
FIG. 4 is a cross-sectioned view showing a slot die coater applied to the electrode active material coating system according to an embodiment of the present disclosure.
Figure 5:
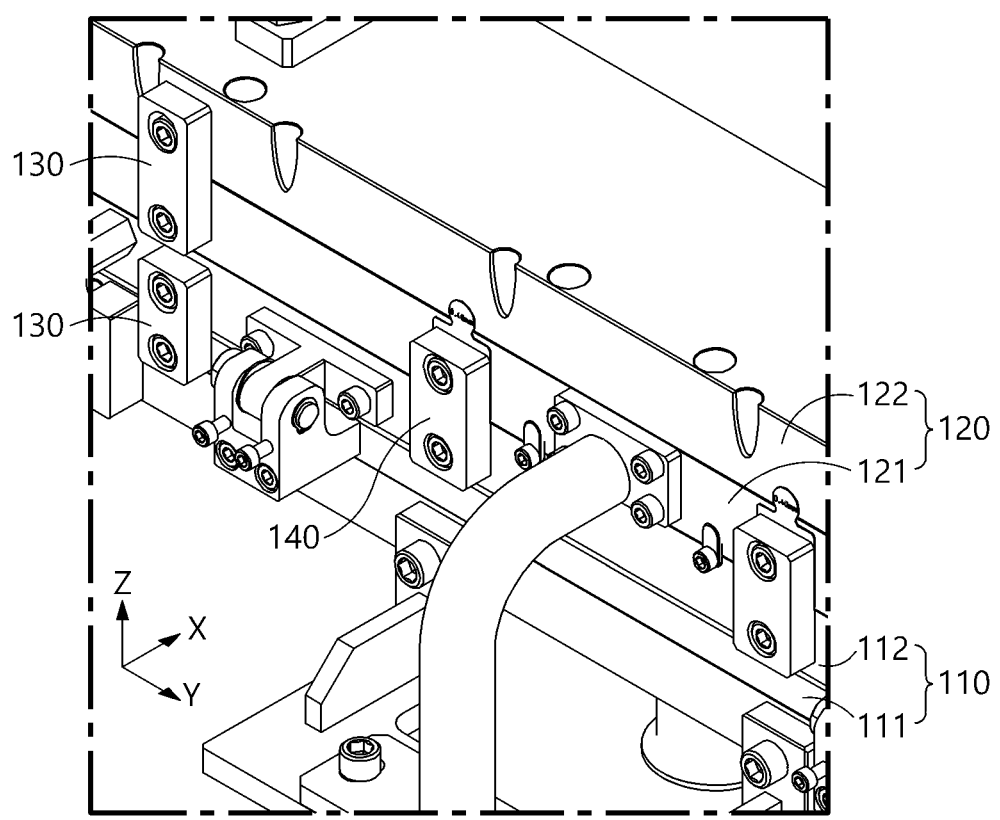
FIG. 5 is a partially enlarged view showing the electrode active material coating system according to an embodiment of the present disclosure and a rear surface of the slot die coater applied thereto.
Figure 6:
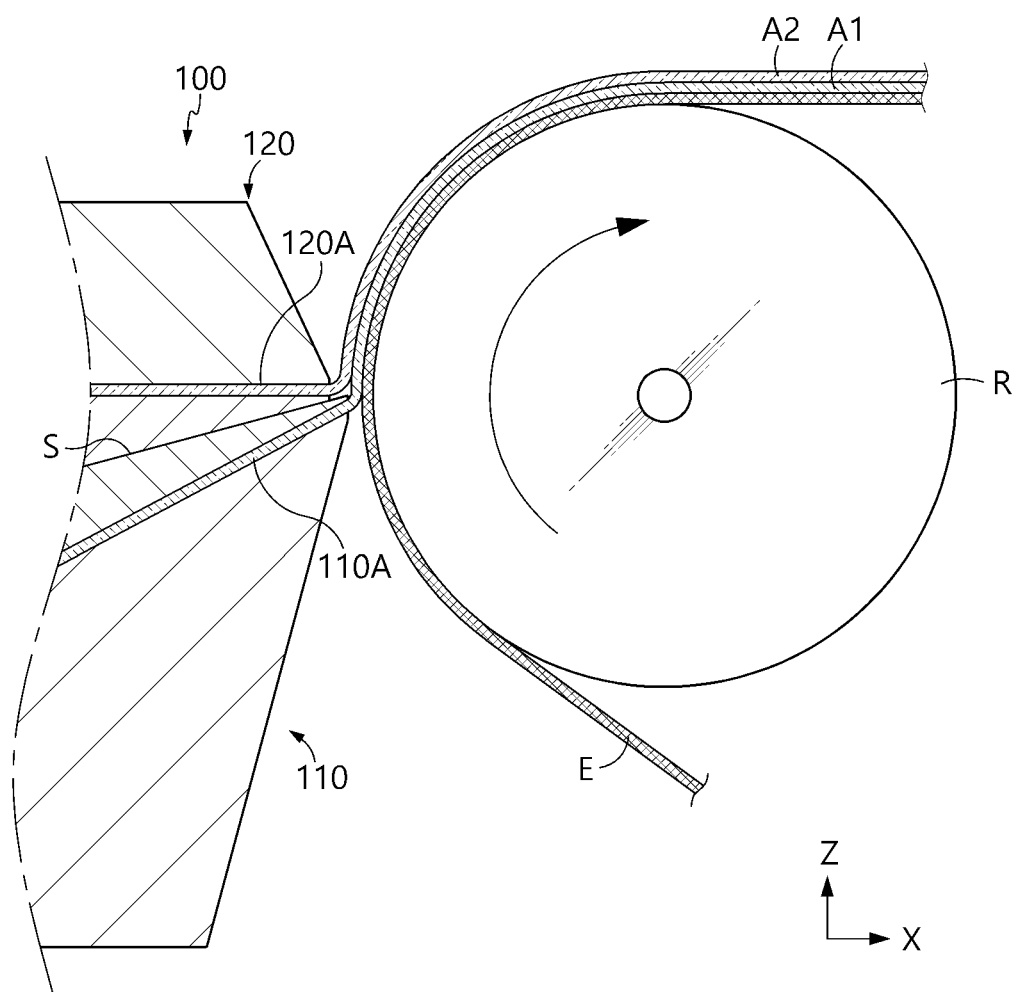
FIG. 6 is a diagram for illustrating a process of forming two active material layers on an electrode current collector by using the slot die coater of FIG. 4.

FIG. 4 is a cross-sectioned view showing a slot die coater applied to the electrode active material coating system according to an embodiment of the present disclosure, FIG. 5 is a partially enlarged view showing the electrode active material coating system according to an embodiment of the present disclosure and a rear surface of the slot die coater applied thereto, and FIG. 6 is a diagram for illustrating a process of forming two active material layers on an electrode current collector by using the slot die coater of FIG. 4.

Referring to FIGS. 4 to 6, the slot die coater 100 includes the lower die 110 having a lower discharge hole 110A and the upper die 120 having an upper discharge hole 120A.

The lower die 110 includes a first die block 111 and a second die block 112 disposed at an upper portion of the first die block 111. The first die block 111 may have a first active material slurry receiving portion G1 formed in a groove shape having a predetermined depth at a surface thereof facing the second die block 112. The first active material slurry receiving portion G1 may be connected to an active material slurry supply chamber (not shown) installed at the outside to continuously receive a first active material slurry. In addition, the first active material slurry receiving portion G1 may have an active material slurry supply port communicating with the active material slurry supply chamber.

If the first active material slurry is fully filled in the first active material slurry receiving portion G1 as the first active material slurry is supplied by the active material slurry supply chamber, the first active material slurry is discharged to the outside through the lower discharge hole 110A that is formed as the first die block 111 and the second die block 112 are coupled.

The upper die 120 includes a third die block 121 and a fourth die block 122 disposed at an upper portion of the third die block 121. The third die block 121 may have a second active material slurry receiving portion G2 formed in a groove shape having a predetermined depth at a surface thereof facing the fourth die block 122. The second active material slurry receiving portion G2 may be connected to an active material slurry supply chamber installed outside to receive a second active material slurry continuously. In addition, the second active material slurry receiving portion G2 may have an active material slurry supply port communicating with the active material slurry supply chamber.

If the second active material slurry is fully filled in the second active material slurry receiving portion G2 as the second active material slurry is supplied by the active material slurry supply chamber, the second active material slurry is discharged to the outside through the upper discharge hole 120A that is formed as the third die block 121 and the fourth die block 122 are coupled.

The facing surface of the lower die 110 and the upper die 120 is inclined at a predetermined angle with respect to the ground. That is, the facing surface of the lower die 110 and the upper die 120 forms the sliding surface S inclined with respect to the ground at a predetermined angle, and the upper die 120 moves forward or backward on the lower die 110 along the sliding surface S in a direction inclined at a predetermined angle with respect to the ground.

Here, the "front" means a direction in which the discharge holes 110A, 120A of the slot die coater 100 are formed, the "rear" means a direction opposite thereto.

Meanwhile, the slot die coater 100 may further include the first fixing portion 130 and the second fixing portion 140 provided at rear surface thereof. The first fixing portion 130 is provided in at least one pair to fasten the first die block 111 and the second die block 112 to each other and also fasten the third die block 121 and the fourth die block 122 to each other.

The second fixing portion 140 is installed with a certain assembly tolerance (approximately 300 μm to 500 μm), taking into account that the upper die 120 must move forward or rearward on the lower die 110.

That is, as will be described later, the upper die 120 moves forward or rearward on the lower die 110 along the sliding surface S due to the movement of the movable block 233 (see FIG. 3) along the arrow direction. Here, the second fixing portion 140 fixes the lower die 110 and the upper die 120 not to move no more than a certain level while allowing fine movement due to the assembly tolerance.

Referring to FIG. 6, the upper die 120 may move forward or rearward on the lower die 110 along the sliding surface S such that a gap is formed between the first discharge hole 110A and the second discharge hole 120A.

In particular, if the upper die 120 moves rearward in a state where the lower die 110 and the upper die 120 are matched so that the second discharge hole 120A is located rearward further to the first discharge hole 110A, a first active material layer A1 may be formed first on an electrode current collector E wound around a coating roll R and supplied therefrom, and a second active material layer A2 may be formed thereon.

At this time, a moving distance of the upper die 120 is set in consideration of the thickness of the second active material layer A2 to be stacked, thereby stably stacking the second active material layer A2 on the first active material layer A1.

Next, each component of the slot die coater adjusting device 200 according to an embodiment of the present disclosure will be described in detail with reference to FIGS. 7 and 8 along with FIG. 4.

Figure 7:
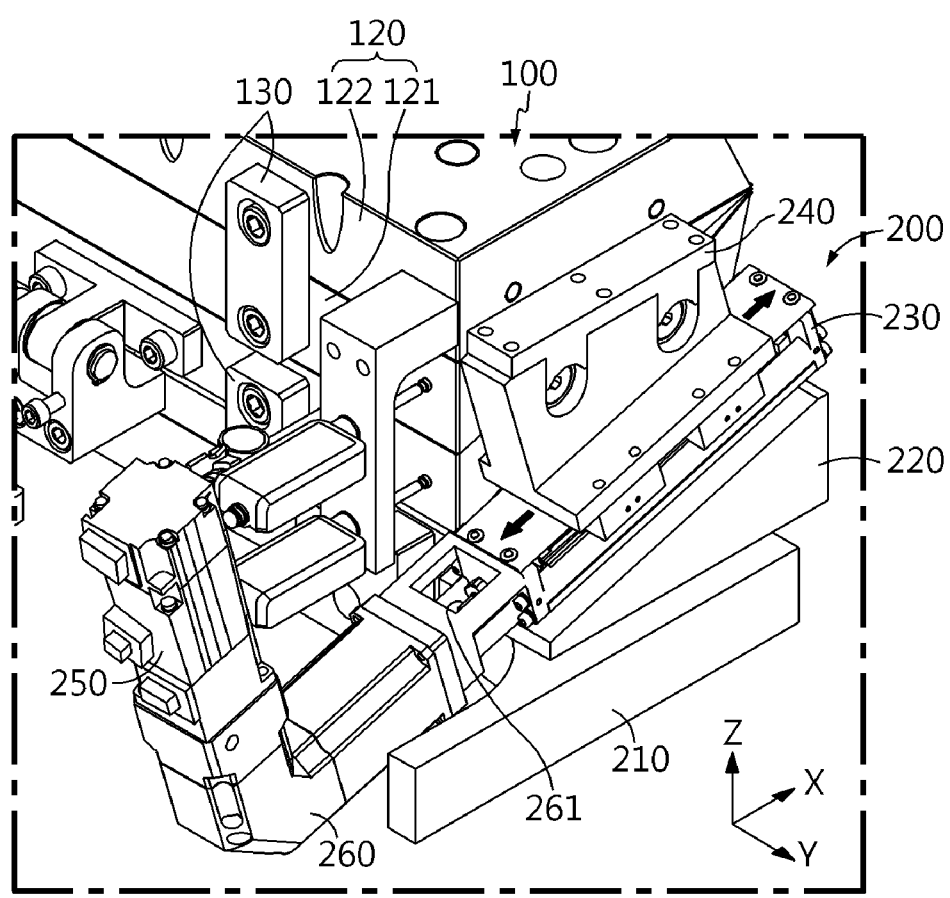
FIG. 7 is a partial perspective view showing a portion of the electrode active material coating system according to an embodiment of the present disclosure.
Figure 8:
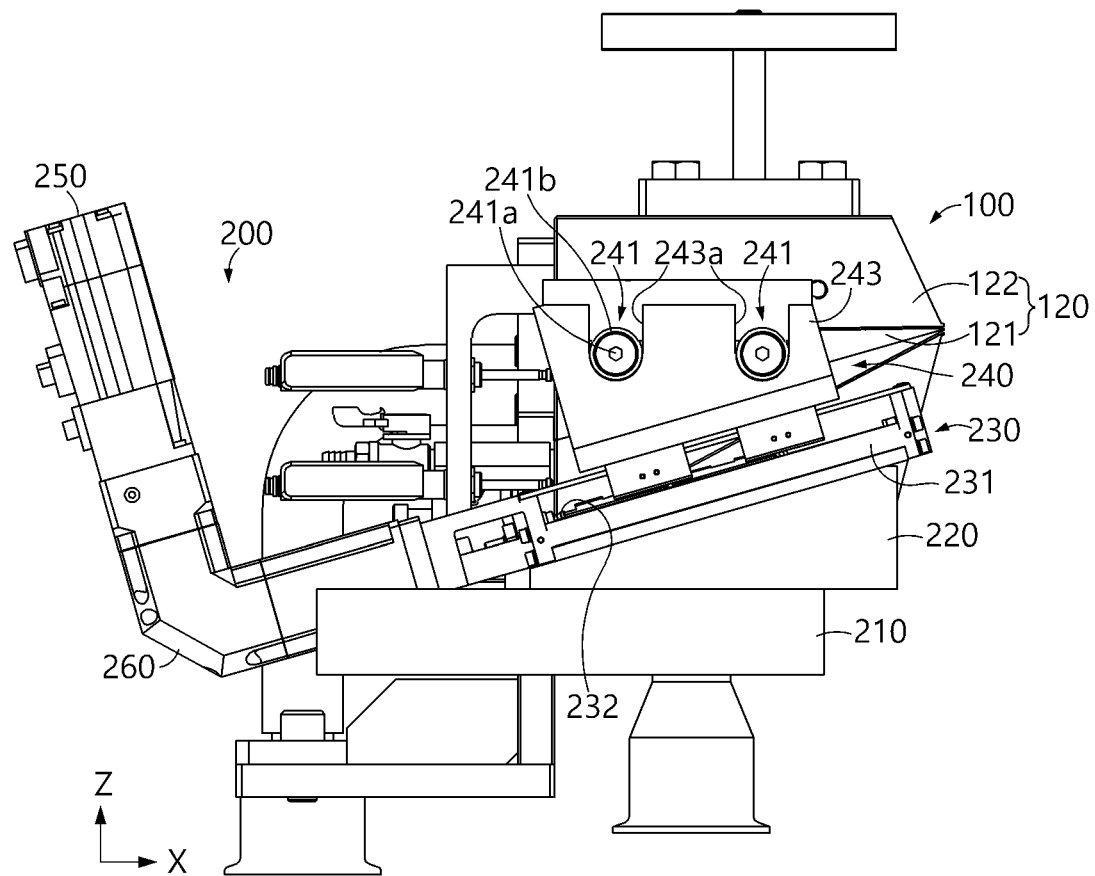
FIG. 8 is a side view showing the electrode active material coating system according to an embodiment of the present disclosure.

FIG. 7 is a partial perspective view showing a portion of the electrode active material coating system according to an embodiment of the present disclosure, and FIG. 8 is a side view showing the electrode active material coating system according to an embodiment of the present disclosure.

Referring to FIGS. 7 and 8 along with FIG. 4, the slot die coater adjusting device according to an embodiment of the present disclosure is configured to adjust the distance between the pair of discharge holes formed in the slot die coater 100 and may include a base block 210, an inclined block 220, a LM guide 230, a pressing block assembly 240, a servo motor 250, and a reducer 260.

As described above, the base block 210 is disposed at the lower portion of the inclined block 220 to support the inclined block 220. Here, it is also possible that the pressing block assembly 240 is disposed at a height corresponding to the upper die 120 by adjusting the size of the inclined block 220 while excluding the base block 210.

As described above, the inclined block 220 has an upper surface parallel with the sliding surface S (see FIG. 4) of the slot die coater 100. Accordingly, the upper die 120 may move smoothly in the front and rear direction along the sliding surface S according to the linear movement of the movable block 233 included in the LM guide 230 that is placed on the upper surface of the inclined block 220.

The LM guide 230 includes a guide frame 231 placed on the top surface of the inclined block 220, a ball screw 232 installed inside the guide frame 231, and at least one movable block 233 fastened with the ball screw 232.

The ball screw 232 is located inside the guide frame 231 and is fastened with the guide frame 231 to rotate. The ball screw 232 is connected to a drive shaft 261 of the reducer 260, explained later, and rotates as the drive shaft 261 of the reducer 260 rotates by the power transmitted from the servo motor 250.

The ball screw 232 has a thread formed on at least a part of its surface, and the movable block 233 is fastened with the threaded portion. A thread corresponding to the thread formed on the ball screw 232 is formed at the inner surface of the movable block 233. Thus, if the ball screw 232 is rotated by the power transmitted through the servo motor 250 and the reducer 260, the movable block 233 linearly moves forward or rearward along the arrow direction shown in FIG. 7.

The pressing block assembly 240 includes at least one cam follower 241 coupled to a side surface of the upper die 120 of the slot die coater 100 and a pressing block 243 fixed onto the movable block 233 of the LM guide 230 to apply a force to the cam follower 241 according to the movement of the movable block 233 so that the upper die 120 moves.

The cam follower 241 includes a rotary shaft 241a coupled to the side surface of the upper die 120 and a bearing 241b configured to rotate based on the rotary shaft 241a. The pressing block 243 has an insert hole 243a with a size corresponding to the bearing 241b so that the cam follower 241 may be inserted therein. Thus, the bearing 241b is inserted into the insert hole 243a and rotates in contact with an inner wall of the insert hole 243a according to the movement of the pressing block 243. Due to the rotation of the bearing 241b, the upper die 120 may move smoothly along the front and rear direction according to the movement of the pressing block 243.

Due to the fine design tolerances and/or assembly tolerances of the components, the moving direction of the movable block 233 and the pressing block 243 and the moving direction of the upper die 120 may not be perfectly matched. In this case, the components may be worn out due to frictions between components in contact, and the force may not be smoothly transmitted.

That is, a slight difference may be created between the inclination of the upper surface of the inclined block 220 and the inclination of the sliding surface S of the slot die coater 100, and also the movement of the movable block 233 may not be perfectly matched with the arrow direction shown in FIG. 7.

However, in the case of the slot die coater adjusting device 200 according to the present disclosure, without directly fixing the pressing block 243 to the upper die 120, the cam follower 241 having the bearing 241b is fixed to the upper die 120, and the bearing 241b of the cam follower 241 is moved by pushing toward the pressing block 243, thereby preventing the above problem.

That is, when the inner wall of the insert hole 243a applies a force to the bearing 241b, even though the moving direction of the pressing block 243 is not formed perfectly parallel to the arrow direction shown in FIG. 7, the pressing block 243 may smoothly move in all directions within the tolerance range according to the rotation of the bearing 241b.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A slot die coater adjusting device, comprising:
pressing block assemblies respectively provided to both longitudinal sides of a slot die coater and fixed to an upper die of the slot die coater;
a linear motion (LM) guide disposed at a lower portion of the pressing block assembly and connected to the pressing block assembly to guide a movement of the pressing block assembly;
a servo motor configured to give a power for moving the LM guide; and
a reducer connected between the servo motor and the LM guide,
wherein the slot die coater adjusting device is configured to adjust the slot die coater including a lower die having a lower discharge hole for discharging a first active material slurry and the upper die having an upper discharge hole for discharging a second active material slurry, to adjust a distance between the lower discharge hole and the upper discharge hole by allowing the upper die to move,
wherein the pressing block assembly includes:
a cam follower fixed to the upper die; and
a pressing block fixed on the LM guide and having an insert hole into which the cam follower is inserted.

2. The slot die coater adjusting device according to claim 1, further comprising:
an inclined block disposed at a lower portion of the LM guide to support the LM guide.

3. The slot die coater adjusting device according to claim 2,
wherein the inclined block has an upper surface inclined at a predetermined angle with respect to the ground to be parallel with a facing surface of the upper die and the lower die.

4. The slot die coater adjusting device according to claim 1,
wherein the LM guide includes:
a guide frame;
a ball screw installed inside the guide frame and connected to the reducer to receive the power therefrom; and
a movable block fastened with the ball screw to linearly move in a front and rear direction of the slot die coater according to a rotation of the ball screw.

5. The slot die coater adjusting device according to claim 1,
wherein the cam follower includes:
a rotary shaft fixed to the upper die; and
a bearing provided in contact with an inner wall of the insert hole and configured to rotate based on the rotary shaft.

6. An electrode active material coating system, comprising:
a slot die coater including a lower die having a lower discharge hole for discharging a first active material slurry and an upper die having an upper discharge hole for discharging a second active material slurry;
pressing block assemblies respectively provided to both longitudinal sides of the slot die coater and fixed to the upper die;
a LM guide disposed at a lower portion of the pressing block assembly and connected to the pressing block assembly to guide a movement of the pressing block assembly;
a servo motor configured to give a power for moving the LM guide; and
a reducer connected between the servo motor and the LM guide,
wherein the pressing block assembly includes:
a cam follower fixed to the upper die; and
a pressing block fixed on the LM guide and having an insert hole into which the cam follower is inserted.

7. The electrode active material coating system according to claim 6, further comprising:
an inclined block disposed at a lower portion of the LM guide to support the LM guide.

8. The electrode active material coating system according to claim 7,
wherein the inclined block has an upper surface inclined at a predetermined angle with respect to the ground to be parallel with a facing surface of the upper die and the lower die.

9. The electrode active material coating system according to claim 6,
wherein the LM guide includes:
a guide frame;
a ball screw installed inside the guide frame and connected to the reducer to receive the power therefrom; and
a movable block fastened with the ball screw to linearly move in a front and rear direction of the slot die coater according to a rotation of the ball screw.

10. The electrode active material coating system according to claim 6,
wherein the cam follower includes:
a rotary shaft fixed to the upper die; and
a bearing provided in contact with an inner wall of the insert hole and configured to rotate based on the rotary shaft.

* * * * *